United States Patent
Fukushige

(10) Patent No.: US 9,227,518 B2
(45) Date of Patent: Jan. 5, 2016

(54) ROTARY ELECTRIC MACHINE AND IN-VEHICLE ROTARY ELECTRIC MACHINE SYSTEM

(75) Inventor: Takashi Fukushige, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 399 days.

(21) Appl. No.: 13/880,257

(22) PCT Filed: Sep. 20, 2011

(86) PCT No.: PCT/JP2011/071299
§ 371 (c)(1),
(2), (4) Date: Apr. 18, 2013

(87) PCT Pub. No.: WO2012/053304
PCT Pub. Date: Apr. 26, 2012

(65) Prior Publication Data
US 2013/0200697 A1 Aug. 8, 2013

(30) Foreign Application Priority Data
Oct. 19, 2010 (JP) ................. 2010-234765

(51) Int. Cl.
| | |
|---|---|
| B60L 1/00 | (2006.01) |
| B60L 11/18 | (2006.01) |
| H02K 1/14 | (2006.01) |
| H02K 3/04 | (2006.01) |
| H02K 11/00 | (2006.01) |
| H02K 99/00 | (2014.01) |
| B60L 9/22 | (2006.01) |
| H02K 16/00 | (2006.01) |

(52) U.S. Cl.
CPC ............... *B60L 11/1814* (2013.01); *B60L 9/22* (2013.01); *B60L 11/1803* (2013.01); *B60L 11/1812* (2013.01); *H02K 1/146* (2013.01); *H02K 3/04* (2013.01); *H02K 11/0094* (2013.01); *H02K 57/00* (2013.01); *B60L 2210/14* (2013.01); *B60L 2220/54* (2013.01); *B60L 2270/147* (2013.01); *H02K 16/00* (2013.01); *Y02T 10/641* (2013.01); *Y02T 10/7005* (2013.01); *Y02T 10/7225* (2013.01); *Y02T 90/127* (2013.01); *Y02T 90/14* (2013.01)

(58) Field of Classification Search
USPC .................................. 307/9.1, 10.1
See application file for complete search history.

(56) References Cited

U.S. PATENT DOCUMENTS

| | | | |
|---|---|---|---|
| 6,204,627 B1 | 3/2001 | Watanabe et al. | |
| 6,711,037 B2 | 3/2004 | Odachi et al. | |
| 2002/0191423 A1 | 12/2002 | Odachi et al. | |
| 2004/0000831 A1* | 1/2004 | Hirano et al. | 310/184 |
| 2007/0120520 A1* | 5/2007 | Miyazaki et al. | 318/801 |
| 2010/0019734 A1 | 1/2010 | Oyobe et al. | |

FOREIGN PATENT DOCUMENTS

| | | |
|---|---|---|
| CN | 101253666 A | 8/2008 |
| JP | 62-239849 A | 10/1987 |
| JP | 06-013250 A | 1/1994 |
| JP | 07-075213 A | 3/1995 |
| JP | 09-233709 A | 9/1997 |
| JP | 10-304688 A | 11/1998 |
| JP | 2000-061360 A | 2/2000 |
| JP | 2000-278868 A | 10/2000 |
| JP | 2002-369545 A | 12/2002 |
| JP | 2005-073500 A | 3/2005 |
| JP | 2009-027831 A | 2/2009 |
| JP | 2010/051144 A | 3/2010 |
| JP | 2010-151595 A | 7/2010 |

OTHER PUBLICATIONS

Chinese Office Action dated Dec. 3, 2014, 10 pgs.

* cited by examiner

*Primary Examiner* — Danny Nguyen
(74) *Attorney, Agent, or Firm* — Foley & Lardner LLP

(57) ABSTRACT

A rotary electric machine includes a rotor; a stator magnet core; a transformer primary coil wound around the stator magnet core in an insulation state and connected to a power circuit; a transformer secondary coil wound around the stator magnet core in an insulation state and connected to a battery by interposing a DC/AC converter.

19 Claims, 16 Drawing Sheets

ROTARY ELECTRIC MACHINE AND IN-VEHICLE ROTARY ELECTRIC MACHINE SYSTEM

TECHNICAL FIELD

The present disclosure relates to a rotary electric machine and an in-vehicle rotary electric machine system using the same.

BACKGROUND ART

As disclosed in JP-H09-233709-A, an electrical vehicle that travels using a battery or the like has a circuit for controlling of the driving of a rotary electric machine and an external power transfer circuit (generally, an electric charging circuit).

SUMMARY

However, these circuits have a large size, and a more compact size is desirable.

The present disclosure has been made by focusing on such problems in the related art. It is therefore an object of this invention to provide a more compact rotary electric machine and an in-vehicle rotary electric machine system using the same.

According to an embodiment of the present invention, there is provided a rotary electric machine including a rotor; a stator magnet core; a transformer primary coil wound around the stator magnet core in an insulation state and connected to a power circuit; a transformer secondary coil wound around the stator magnet core in an insulation state and connected to a battery by interposing a DC/AC converter.

The foregoing and additional features and characteristics of this disclosure will become more apparent from the following detailed description considered with the reference to the accompanying drawings.

EMBODIMENT

First Embodiment

Structure of Rotary Electric Machine

Figure 1:
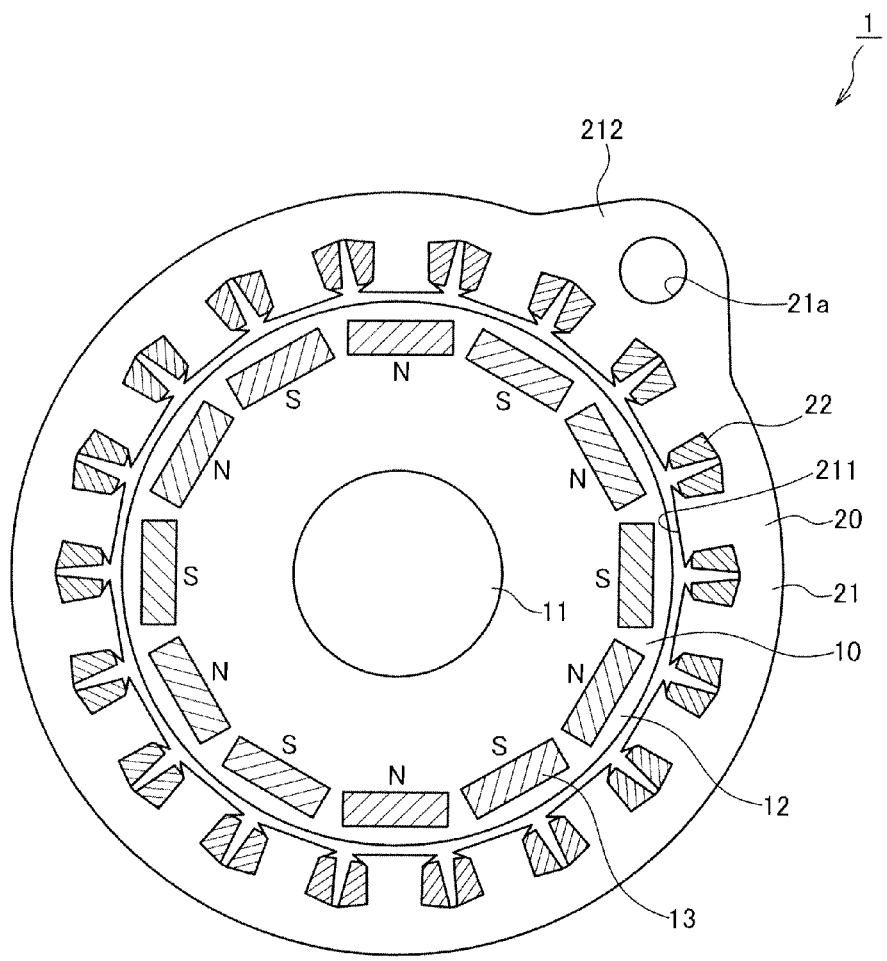
FIG. 1 is a cross-sectional view illustrating a schematic configuration of a rotary electric machine according to a first embodiment of the present invention.

FIG. 1 is a cross-sectional view illustrating a schematic configuration of a rotary electric machine according to a first embodiment of the present invention.

Here, description will be made by exemplifying a permanent magnet type three-phase AC motor having 12 poles and 18 slots as the rotary electric machine 1. In order to clearly construe a concept of the invention, a summary of the invention will be first described in brief. An electrical vehicle traveling using a battery or the like has a circuit for driving and controlling the rotary electric machine and an external power transfer circuit (generally, an electric charging circuit). These circuits typically have a large size. For this reason, a more compact size is desirable in these circuits. In this regard, the inventors paid attention to a fact that the circuit for controlling of the driving of the rotary electric machine and the external power transfer circuit (generally, an electric charging circuit) are configured using a plurality of similar components, and they are not used at the same time, so that they may be shared. The embodiments will be described in more detail as follows.

The rotary electric machine 1 includes a rotor 10 and a stator 20.

The rotor 10 includes a shaft 11, a rotor magnet core 12, and a permanent magnet 13.

The shaft 11 serves as a central axis of rotation of the rotor 10.

The rotor magnet core 12 is installed around the shaft 11. The rotor magnet core 12 is formed by stacking a plurality of circular thin steel sheets. A hole is formed in an outer circumference of the rotor magnet core 12. A permanent magnet 13 is inserted into the hole.

The permanent magnets 13 are provided to extend across nearly the entire length of the rotor 10. The permanent magnets 13 are arranged such that magnetic poles of the neighboring permanent magnets are different from each other.

The stator 20 includes a stator magnet core 21 and a stator coil 22. The stator 20 is arranged in an outer circumference of the rotor 10.

The stator magnet core 21 is formed by stacking a plurality of thin steel sheets. The inner circumference side of the stator magnet core 21 is provided with tooth 211. The stator coil 22 is wound around the tooth 211 by interposing an insulation layer.

As an electric current flows through the stator coil 22, a magnetic flux is generated so that a repulsive/attractive force is generated in the permanent magnet 13. As a result, the rotor 10 is rotated with respect to the shaft 11.

A hole 21a is formed in the stator magnet core 21. According to the present embodiment, a tab 212 is formed by protruding a part of the stator magnet core 21. The hole 21a is formed in this tab 212.

Figure 2:
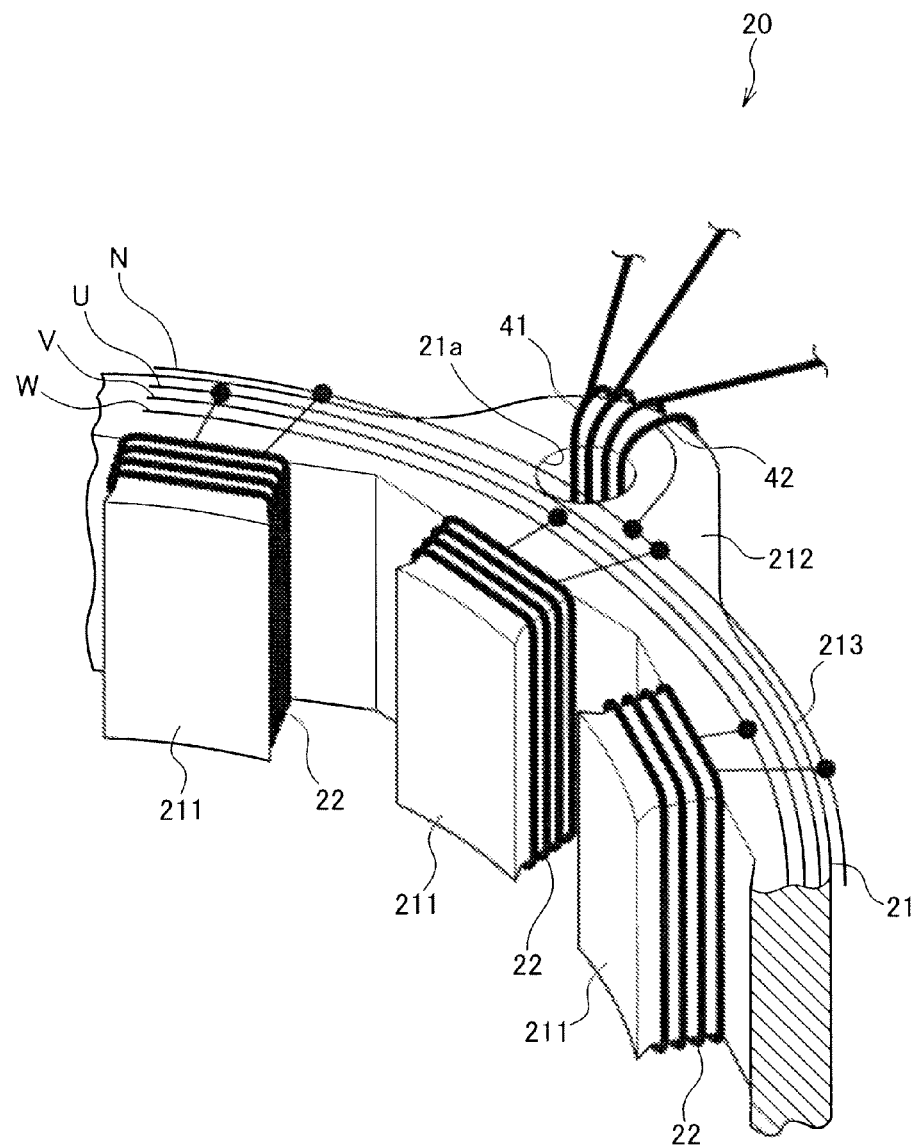
FIG. 2 is a perspective view illustrating main components of the rotary electric machine according to the first embodiment of the present invention.

FIG. 2 is a perspective view illustrating main components of the rotary electric machine according to the first embodiment of the present invention.

A U-phase AC power line, a V-phase AC power line, and a W-phase AC power line are arranged along a back yoke 213 of the stator magnet core 21. In addition, an N-line as a neutral point is arranged. The stator coil 22 formed in the tooth 211 is connected to the N-line and any one of the AC power lines. The stator coil (U-phase coil) 22 formed in the left tooth 211 is connected to the N-line and the U-phase AC power line. The stator coil (V-phase coil) 22 formed in the center tooth 211 is connected to the N-line and the V-phase AC power line. The stator coil (W-phase coil) 22 formed in the right tooth 211 is connected to the N-line and the W-phase AC power line. It is noted that, although the left and right sides are not illustrated in FIG. 2, this structure is sequentially repeated.

A primary coil 41 and a secondary coil 42 are wound around the outer side of the stator magnet core 21 through the hole 21a. As described below, the primary coil 41 is connected to the power circuit. One end of the secondary coil 42 is connected to the neutral point (N-line), and the other end is connected to a DC/AC converter 7 as described below.

In this configuration, the primary coil 41, the secondary coil 42, and the stator magnet core 21 constitute a transformer. In this manner, since a transformer functionality can be obtained by sharing a part of the rotary electric machine 1, a size thereof is reduced as a whole, compared to a case where a transformer is provided using separate components.

<In-Vehicle Rotary Electric Machine System>

Figure 3:
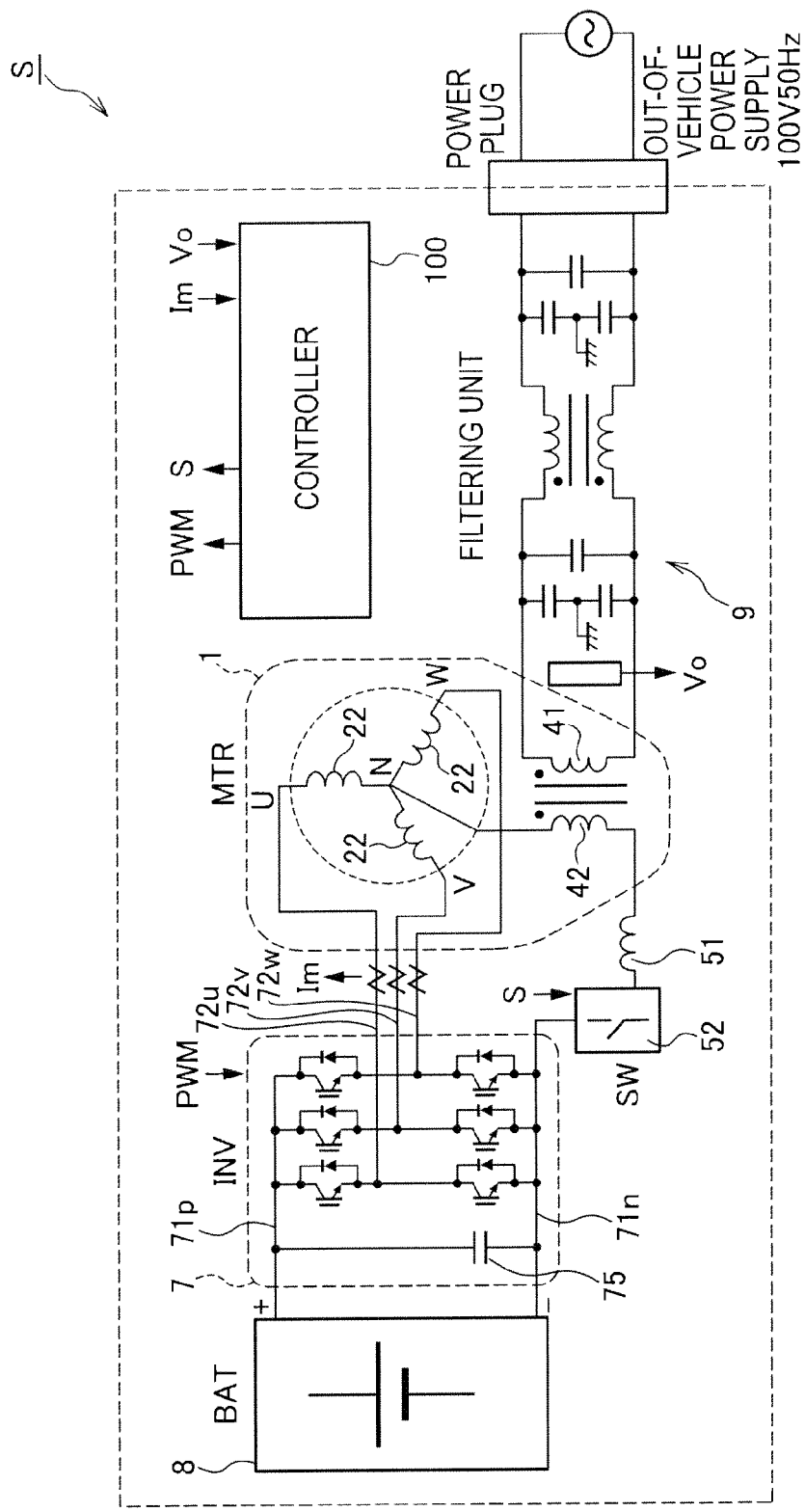
FIG. 3 is a diagram illustrating an in-vehicle rotary electric machine system using the rotary electric machine according to the present invention.

FIG. 3 is a diagram illustrating an in-vehicle rotary electric machine system using the rotary electric machine according to the present invention.

The in-vehicle rotary electric machine system S includes a rotary electric machine 1, a DC/AC converter 7, a battery 8, and a power circuit 9.

The DC/AC converter 7 is provided between the rotary electric machine 1 and the battery 8. The DC/AC converter 7 has both an inverter functionality for converting DC power from the battery 8 to AC power and a converter functionality for converting AC power from the rotary electric machine 1 to DC power. The DC/AC converter 7 has a positive DC power line 71p, a negative DC power line 71n, a U-phase AC power line 72u, a V-phase AC power line 72v, and a W-phase AC power line 72w.

The positive DC power line 71p is connected to a positive electrode of the battery 8. The negative DC power line 71n is connected to a negative electrode of the battery 8. A capacitor 75 is connected between the positive DC power line 71p and the negative DC power line 71n in parallel with the battery 8. The capacitor 75 performs smoothing of the DC power.

The U-phase AC power line 72u is connected to the U-phase coil of the rotary electric machine 1. The V-phase AC power line 72v is connected to the V-phase coil of the rotary electric machine 1. The W-phase AC power line 72w is connected to the W-phase coil of the rotary electric machine 1.

The DC/AC converter 7 has six IGBT modules between the DC power line and the AC power line (including a positive U-phase IGBT module, a negative U-phase IGBT module, a positive V-phase IGBT module, a negative V-phase IGBT module, a positive W-phase IGBT module, and a negative W-phase IGBT module).

Each IGBT module (switching module) includes an insulated gate bipolar transistor (IGBT) as a switching element and a rectifying element (free wheeling diode: hereinafter, referred to as a FWD) connected to the IGBT inversely in parallel. Each IGBT module is turned on/off based on a pulse width modulation (PWM) signal from the controller 100.

The primary coil 41 of the rotary electric machine 1 is connected to the power circuit 9 and is finally connected to an out-of-vehicle power supply through a power plug.

One end of the secondary coil 42 of the rotary electric machine 1 is connected to the neutral point (N-line), and the other end is connected to the negative DC power line 71n through the reactor 51 and the switch 52.

In such an in-vehicle rotary electric machine system, the switch 52 is turned off when a vehicle travels by driving the rotary electric machine 1. Then, the power of the battery 8 is converted to AC power using the DC/AC converter 7 and is supplied to the rotary electric machine 1 to drive the rotary electric machine 1. In addition, regenerative electric power of the rotary electric machine 1 is converted into DC power using the DC/AC converter 7 and is supplied to the battery 8 to charge the battery 8. In this manner, it is possible to cut off the electric current using the switch 52.

When the battery 8 is charged using the out-of-vehicle power supply, the switch 52 is turned on, and the battery 8 is connected to the out-of-vehicle power supply. Then, the AC power of the out-of-vehicle power supply is transmitted to the primary coil 41. As described above, since the primary coil 41, the secondary coil 42, and the stator magnet core 21 constitute a transformer, power boosted to a suitable voltage is converted into DC power using the DC/AC converter 7 from the secondary coil 42, and the DC power is supplied to the battery 8 to charge the battery 8.

In this manner, in the in-vehicle rotary electric machine system according to the present embodiment, the primary coil 41, the secondary coil 42, and the stator magnet core 21 constitute a transformer when electricity is charged using the out-of-vehicle power supply. As a result, insulation is provided between the battery 8 and the out-of-vehicle power supply. If there is no insulation, a high voltage of the battery 8 may be applied to a power terminal connected to the out-of-vehicle power supply when any malfunction occurs. On the contrary, if connection is made through a transformer as in the present embodiment, such a problem does not occur.

According to the present embodiment, a transformer functionality is not separately provided, but it is built in the rotary electric machine 1. Therefore, compared to a case where the transformer is provided using separate components, it is possible to reduce a size as a whole and lower a manufacturing cost.

As described above, according to the present embodiment, the DC/AC converter 7 typically used to drive the rotary electric machine 1 can also be used as an electric power converter between the secondary coil 42 and the battery 8. Therefore, the number of the DC/AC converters for charging can be reduced by 1, so that it is possible to achieve miniaturization.

Figure 4:
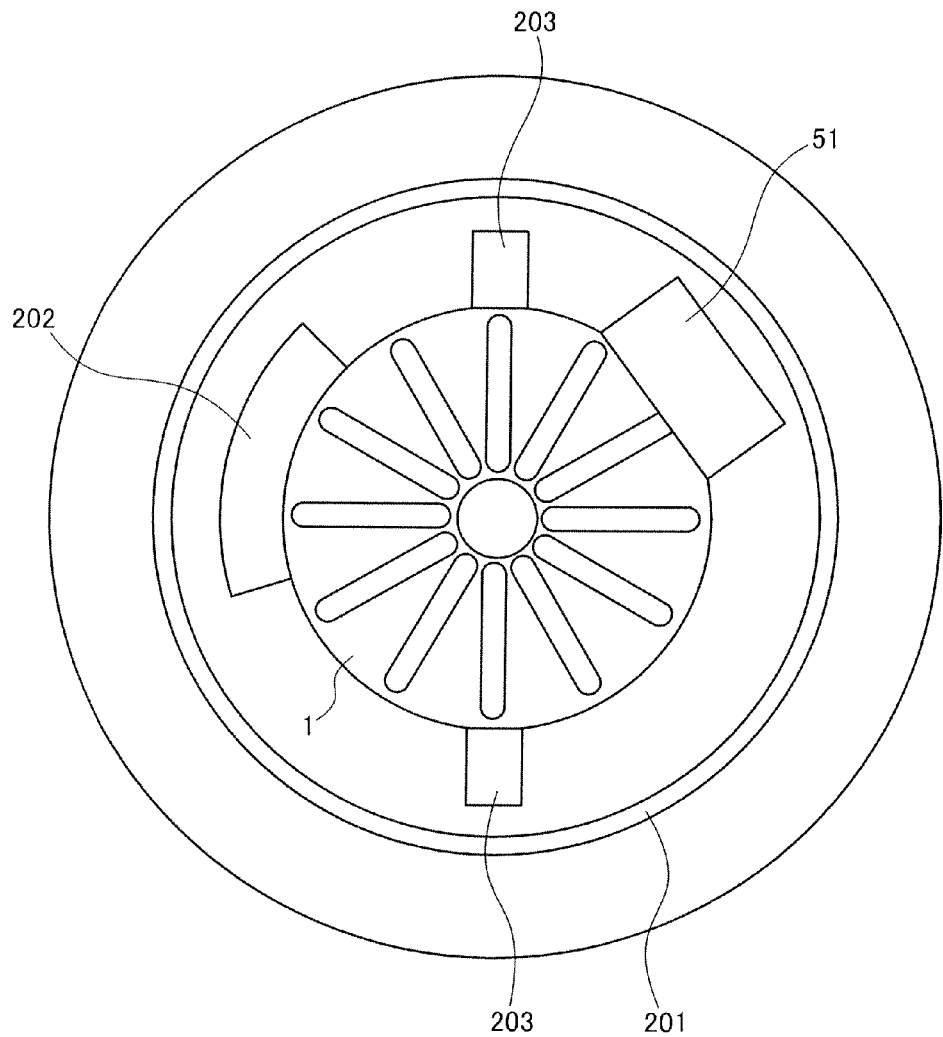
FIG. 4 is a diagram illustrating installation of a reactor in an in-wheel type rotary electric machine.

FIG. 4 is a diagram illustrating installation of the reactor in a case where an in-wheel type rotary electric machine is employed.

An inductance (hereinafter, referred to as a "zero-phase inductance") between the neutral point of the rotary electric machine and the battery 8 is insignificant in a typical rotary electric machine. For this reason, an electric current ripple caused by pulse width modulation significantly increases, so that a loss and a radiation noise may increase. In order to address this problem, a reactor may be provided.

However, a reactor which can absorb a variation in the charging power in synchronization with the PWM frequency of the charging electric current, in other words, a reactor having a certain level of energy storage capability has a large size.

In a so-called in-wheel type rotary electric machine in which the rotary electric machine 1 is arranged in the inner circumference side of the load wheel, the reactor 51 illustrated in FIG. 3 may be provided in a motor room (engine room in a plug-in hybrid electric vehicle (PHEV)). However, since the size of the reactor 51 is large, a vehicle cabin room may be reduced.

In the in-wheel type, as illustrated in FIG. 4, a brake 202 or a suspension member 203 is provided in the inner side of the load wheel 201. Therefore, there is necessarily a vacant space in an outer circumference portion of the rotary electric machine 1.

In this regard, the inventors pay attention to a fact that the reactor 51 may be installed in this space. Then, it is possible to increase space efficiency of the in-wheel type rotary electric machine unit, so that it is not necessary to reduce a vehicle cabin room.

(Rotary Electric Machine According to Second Embodiment)

Figure 5:
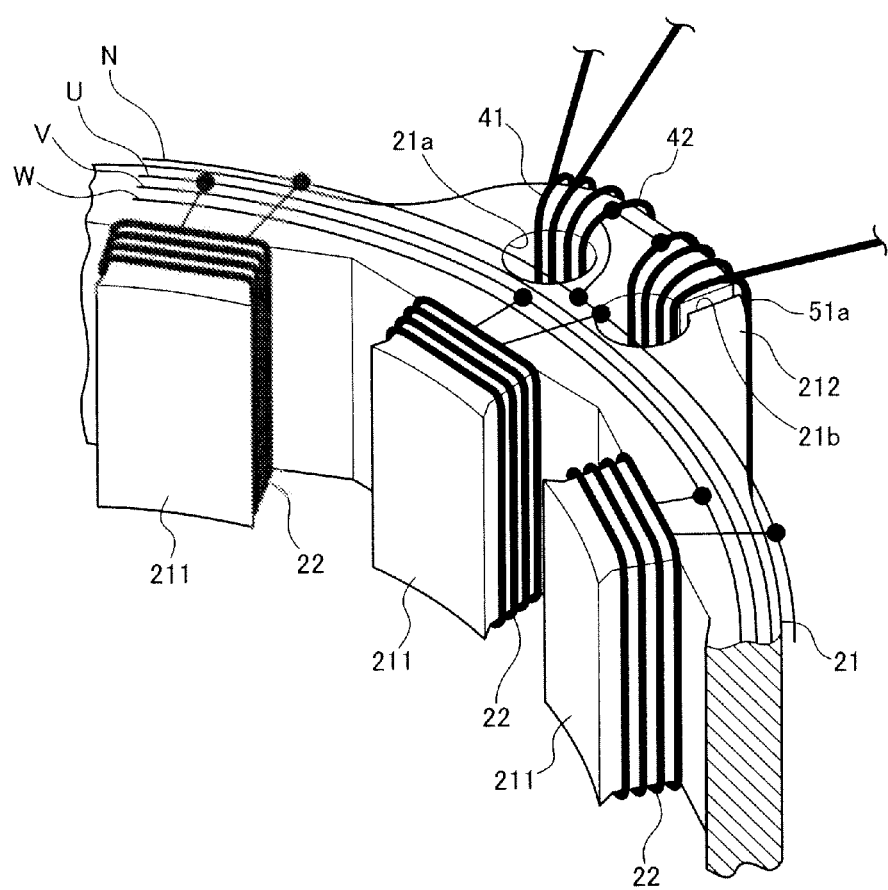
FIG. 5 is a perspective view illustrating main components of a rotary electric machine according to a second embodiment of the present invention.

FIG. 5 is a perspective view illustrating main components of a rotary electric machine according to a second embodiment of the present invention.

According to the present embodiment, a reactor functionality is obtained by sharing a part of the rotary electric machine 1. Specifically, a slit 21b is formed in the stator magnet core 21. According to the present embodiment, the slit 21b is formed, particularly, in the tab 212. In addition, the reactor coil 51a is formed to pass through the outer side of the stator magnet core 21 and the slit 21b. One end of the reactor coil 51a is connected to the secondary coil 42, and the other end is connected to the DC/AC converter 7.

According to the present embodiment, the reactor coil 51a and the stator magnet core 21 constitute a reactor. In this manner, a reactor functionality can be obtained by sharing a part of the rotary electric machine 1. Therefore, compared to a case where a reactor is provided using separate components, it is possible to reduce a size as a whole and lower a manufacturing cost.

(Rotary Electric Machine According to Third Embodiment)

Figure 6:
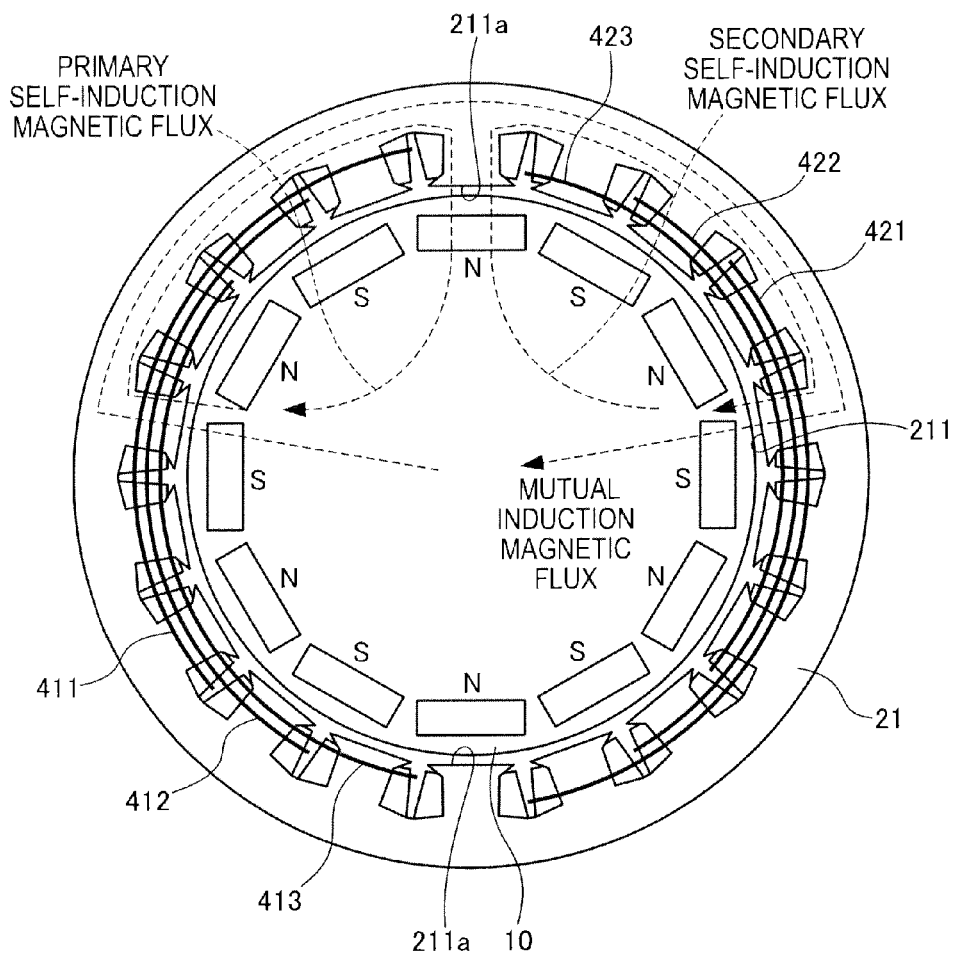
FIG. 6 is a cross-sectional view illustrating a rotary electric machine according to a third embodiment of the present invention.

FIG. 6 is a cross-sectional view illustrating a rotary electric machine according to a third embodiment of the present invention.

In the first embodiment, the primary coil 41 and the secondary coil 42 are formed to pass through the outer side of the stator magnet core 21 and the hole 21a to implement a transformer functionality. On the contrary, according to the present embodiment, the primary coil 41 and the secondary coil 42 are formed to face each other in the tooth 211 of the stator magnet core 21 with a predetermined population and a predetermined pitch to implement a transformer functionality.

The primary coil 41 includes a first coil 411, a second coil 412, and a third coil 413. That is, the primary coil 41 includes three coils, so that the population is set to 3. In addition, the first coil 411, the second coil 412, and the third coil 413 are formed in every 6th tooth. That is, the pitch is set to 6.

The secondary coil 42 is also similar to the primary coil 41. That is, the secondary coil 42 includes a first coil 421, a second coil 422, and a third coil 423. That is, the secondary coil 42 includes three coils, so that the population is set to 3. In addition, the first coil 421, the second coil 422, and the third coil 423 are formed in every 6th tooth. That is, the pitch is set to 6.

Neither the primary coil 41 nor the secondary coil 42 is formed in the tooth 211a out of 18 teeth of the stator magnet core 21. The reason thereof will be described below.

Figure 7A:
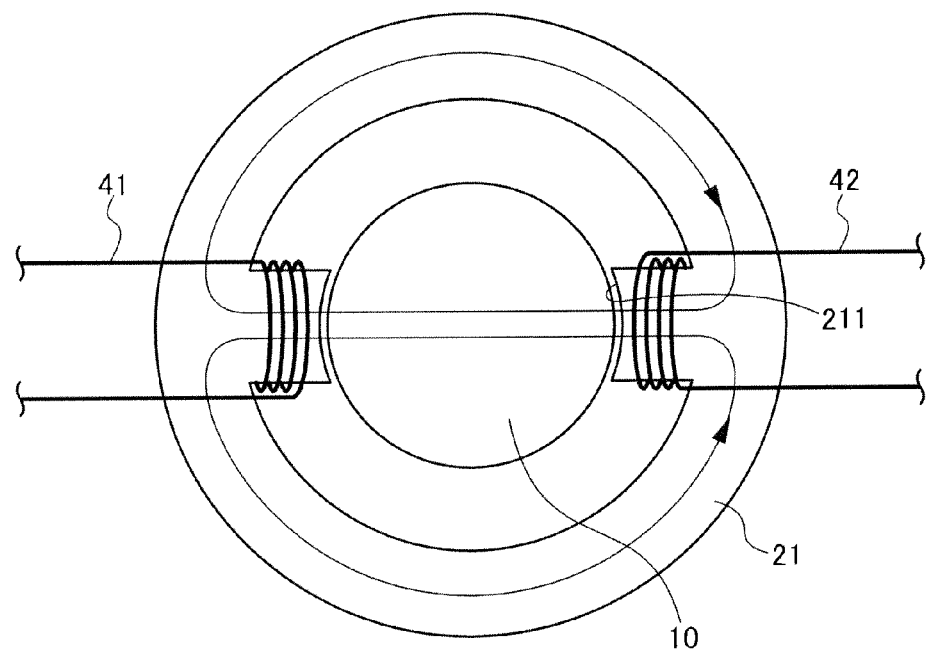
FIG. 7A is a diagram illustrating effects of the rotary electric machine according to the third embodiment of the present invention.
Figure 7B:
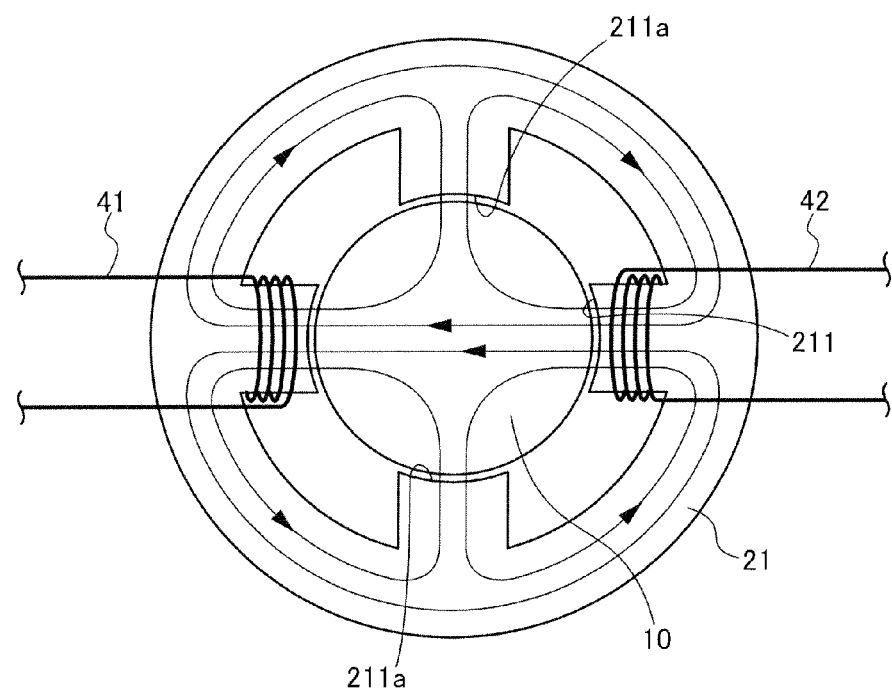
FIG. 7B is a diagram illustrating effects of the rotary electric machine according to the third embodiment of the present invention

FIGS. 7A and 7B are diagrams illustrating the effects of the rotary electric machine according to the third embodiment of the present invention.

According to the present embodiment, the primary coil 41 and the secondary coil 42 are formed in the tooth 211 of the stator magnet core 21 to face each other. In this manner, if an AC current flows through the primary coil 41, a magnetic flux is generated as indicated by the arrow of FIG. 7A, and the AC current also flows through the second coil 42 due to a mutual induction effect, so that it is possible to obtain a transformer functionality. That is, according to the present embodiment, the hole 21a provided in the first embodiment is not necessary, and the size is further miniaturized, compared to the first embodiment.

According to the present embodiment, neither the primary coil 41 nor the secondary coil 42 is formed in the tooth 211a of the stator magnet core 21. In this manner, a leakage magnetic flux of the transformer is generated as indicated by the arrow of FIG. 7B, and a self-inductance of the transformer increases so as to generate a reactor effect. As a result, it is possible to compensate for a shortage of the zero-phase inductance of the rotary electric machine. Therefore, the reactor may become unnecessary, or a reactor having a small energy storage capability may be employed. As a result, it is possible to lower a manufacturing cost and reduce a size as a whole.

According to the present embodiment, the pitch of the coil is set to an integer multiple of a value (3) obtained by dividing the number of slots (18) by the number of pole pairs (6). In addition, the population of the coil is set to an integer multiple of a value (3) obtained by dividing the number of slots (18) by the number of pole pairs (6).

In this manner, the population and the pitch of the coil are set to a integer multiple of the pole arc so that a transformer magnetic flux uniformly flows through the N-pole and the S-pole of the magnet. Therefore, it is possible to suppress generation of a torque caused by this magnetic flux.

That is, a coil winding factor can be obtained by multiplying a distribution factor and a short-pitch factor. That is, an equation is established as follows: (coil winding factor)= (short-pitch factor)×(distribution factor). If the coil winding factor is set to zero, no torque is generated even when an electric current flows through the coil. If the pitch of the coil is set to an integer multiple of a value obtained by dividing the number of slots by the number of pole pairs, the short-pitch factor becomes zero. In addition, if the population of the coil is set to an integer multiple of a value obtained by dividing the number of slots by the number pole pairs, the distribution factor becomes zero. In this regard, according to the present embodiment, it is possible to obtain a transformer functionality without generating a torque.

(In-Vehicle Rotary Electric Machine System According to Second Embodiment)

Figure 8:
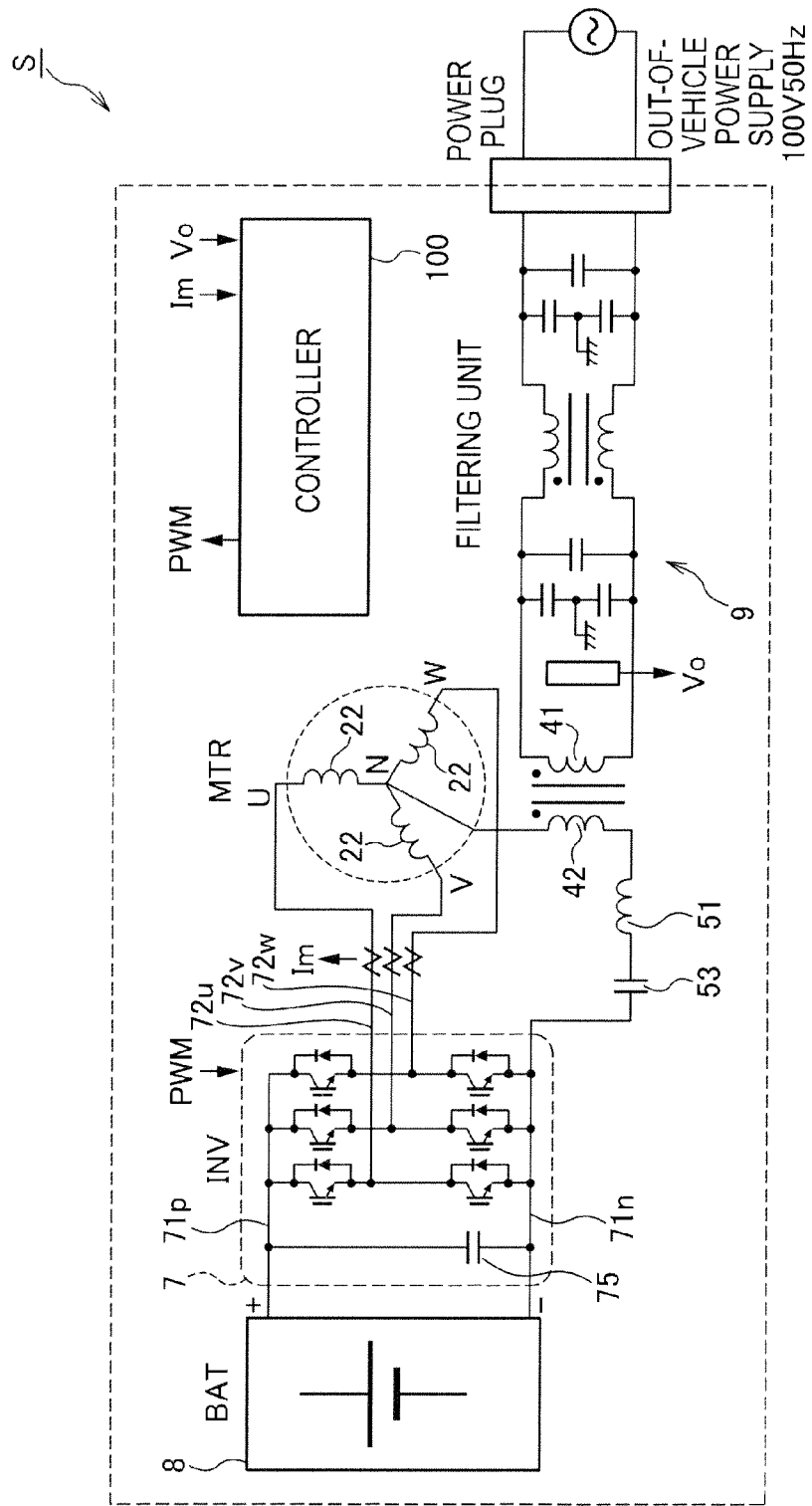
FIG. 8 is a diagram illustrating an in-vehicle rotary electric machine system according to a second embodiment of the present invention.

FIG. 8 is a diagram illustrating an in-vehicle rotary electric machine system according to a second embodiment of the present invention.

In the first embodiment (FIG. 3), the reactor 51 and the negative DC power line 71n are connected by interposing the switch 52. However, according to the present embodiment, a capacitor 53 is employed instead of the switch 52 of FIG. 3.

In such an in-vehicle rotary electric machine system, a voltage of the neutral point becomes a constant voltage corresponding to a half of the voltage of the battery 8 when a vehicle travels by driving the rotary electric machine 1. By nature, an AC current flows through a capacitor, but a DC current does not flow through a capacitor. Therefore, no electric current flows through the capacitor 53 when a vehicle travels by driving the rotary electric machine 1.

The battery 8 is connected to the out-of-vehicle power supply when the battery 8 is charged using the out-of-vehicle power supply. Then, the AC power of the out-of-vehicle power supply is transmitted to the primary coil 41. As described above, since the primary coil 41, the secondary coil 42, and the stator magnet core 21 constitute a transformer, AC power boosted to a suitable voltage flows from the secondary coil 42. Since an AC current flows through the capacitor 53, the power thereof is transmitted to the DC/AC converter 7 and is converted to DC power using the DC/AC converter 7. The converted DC power is supplied to the battery 8 to charge the battery 8.

In this manner, in the in-vehicle rotary electric machine system according to the present embodiment, the capacitor 53 is used instead of the switch 52 according to the first embodiment. Therefore, it is possible to obtain the same functionality as that of the first embodiment with a low cost.

(In-Vehicle Rotary Electric Machine System According to Third Embodiment)

Figure 9:
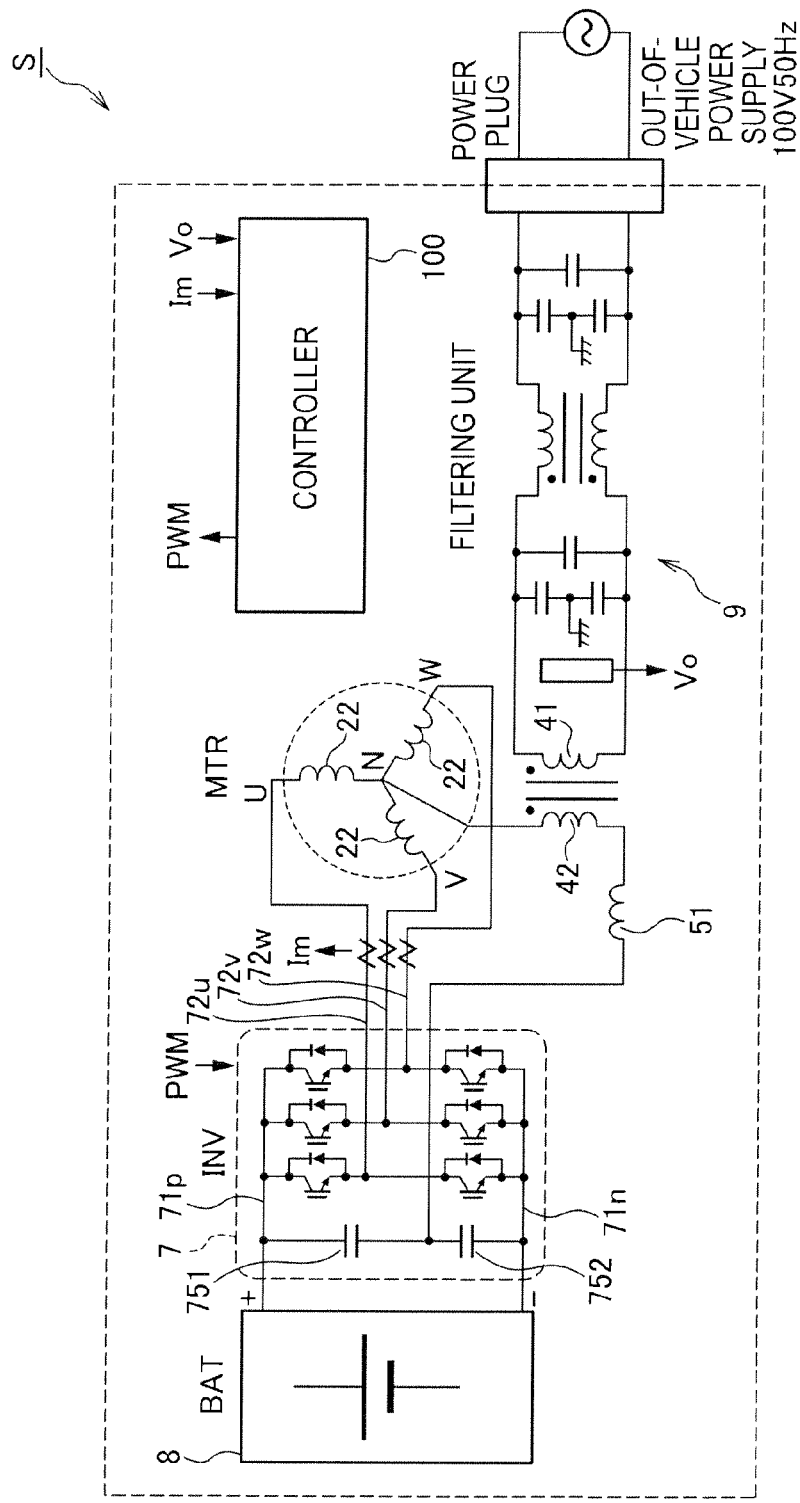
FIG. 9 is a diagram illustrating an in-vehicle rotary electric machine system according to a third embodiment of the present invention.

FIG. 9 is a diagram illustrating an in-vehicle rotary electric machine system according to a third embodiment of the present invention.

In the present embodiment, the capacitors 751 and 752 connected in series are connected to the battery 8 in parallel. In addition, one end of the reactor 51 is connected to the secondary coil 42, and the other end is connected between the capacitors 751 and 752.

In the configuration according to the present embodiment, the capacitor 752 also serves as the capacitor 53 of FIG. 8. Therefore, compared to the second embodiment, it is possible to lower a manufacturing cost. In addition, it is possible to reduce a size as a whole.

(In-Vehicle Rotary Electric Machine System According to Fourth Embodiment)

Figure 10:
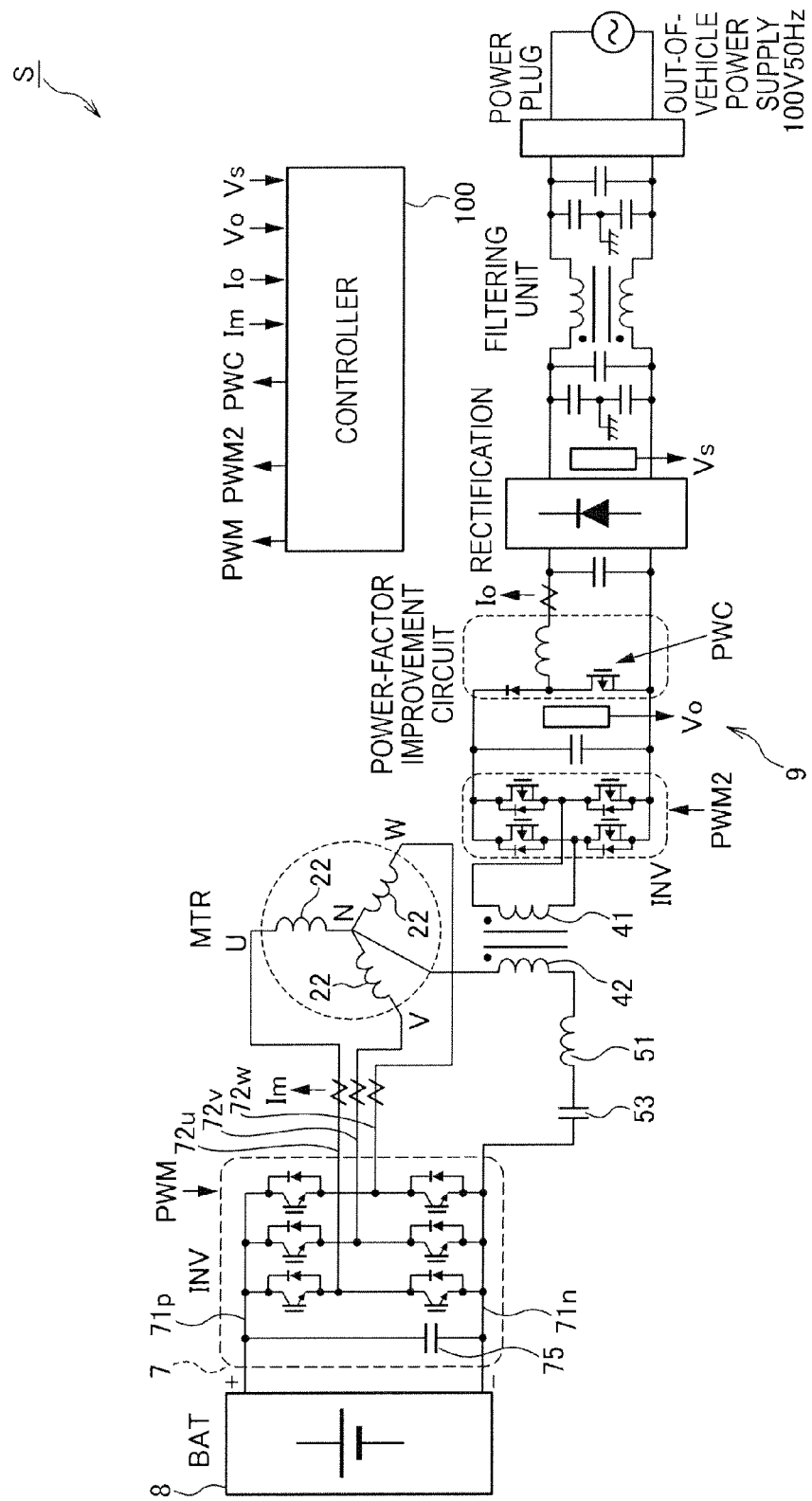
FIG. 10 is a diagram illustrating an in-vehicle rotary electric machine system according to a fourth embodiment of the present invention.

FIG. 10 is a diagram illustrating an in-vehicle rotary electric machine system according to a fourth embodiment of the present invention.

The power circuit 9 according to the present embodiment includes an AC/AC converter obtained by combining a diode bridge type full-wave rectifier, a power-factor improvement circuit, and a MOSFET type inverter.

The power circuit 9 rectifies a frequency (50 to 60 Hz) of the out-of-vehicle power supply to a DC current and converts the DC current to an AC current having a sinusoidal waveform and the like of several hundreds Hz to several kHz using an inverter.

In this configuration, it is possible to increase an operational frequency of the capacitor and the transformer. Therefore, an energy storage amount is reduced. As a result, it is possible to lower a manufacturing cost and reduce a size as a whole. Since it is possible to allow the electric current flowing through the rotary electric machine during the charging to have a high frequency, it is possible to attenuate vibration caused by a minute torque of the rotary electric machine. That is, it is possible to prevent generation of noise or vibration from the rotary electric machine during the charging even when the frequency of the out-of-vehicle power supply is set to 50 to 60 Hz In addition, according to the present embodiment, description has been made by assuming a case where a diode bridge type full-wave rectifier is employed. However, the present invention is not limited thereto. For example, a full bridge type full-wave rectifier including MOSFET and the like may be employed. This is especially effective when the electric power is returned to the out-of-vehicle power supply from a vehicle (so called electric power selling).

(In-Vehicle Rotary Electric Machine System According to Fifth Embodiment)

Figure 11:
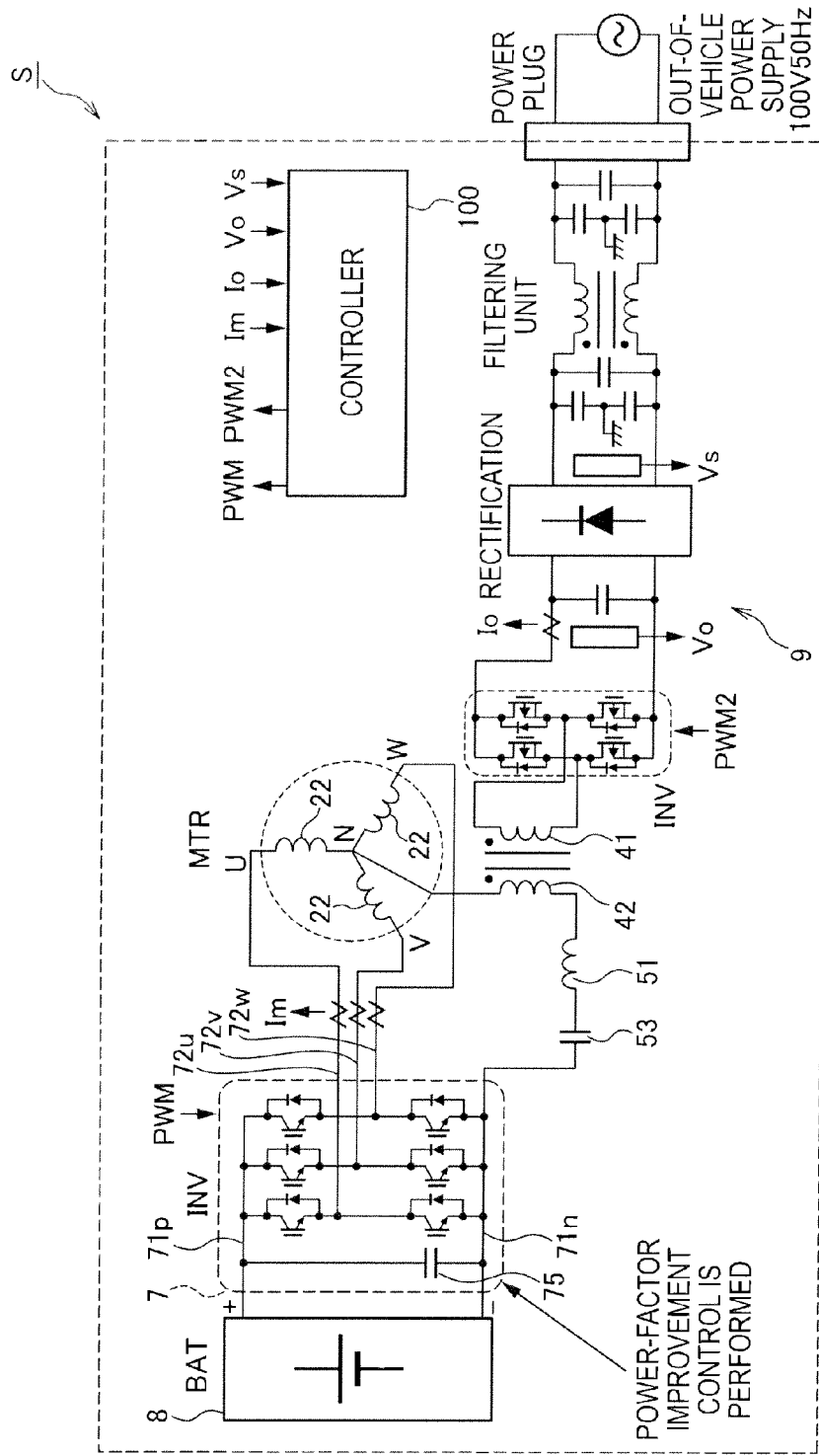
FIG. 11 is a diagram illustrating an in-vehicle rotary electric machine system according to a fifth embodiment of the present invention.

FIG. 11 is a diagram illustrating an in-vehicle rotary electric machine system according to a fifth embodiment of the present invention.

According to the present embodiment, the power-factor improvement circuit provided in the fourth embodiment is omitted, and the power-factor improvement is controlled using the DC/AC converter (inverter for driving the rotary electric machine) 7.

The charging electric power supplied from the out-of-vehicle power supply is obtained by multiplying the transformer electric current by the transformer voltage. Since the transformer electric current can be controlled using the inverter 7 for driving the rotary electric machine, the electric power in the out-of-vehicle power supply side can be controlled. Specifically, in order to allow the electric current from the out-of-vehicle power supply side to have a sinusoidal waveform having a power factor of 1, the electric current of the transformer may be generated using the inverter 7 for driving the rotary electric machine such that electric power proportional to a square of the voltage Vs is generated to have a frequency component corresponding to a double of the frequency of the out-of-vehicle power supply of the electric power passing through the transformer. That is, the following equation is established:

$$\text{(amplitude of transformer current)} \propto Vs^2 \div \text{(amplitude of transformer voltage)}$$

By performing control in this manner, a power-factor improvement circuit dedicated to the out-of-vehicle power supply side is not necessary. Therefore, it is possible to lower a manufacturing cost and reduce a size as a whole.

(In-Vehicle Rotary Electric Machine System According to Sixth Embodiment)

Figure 12:
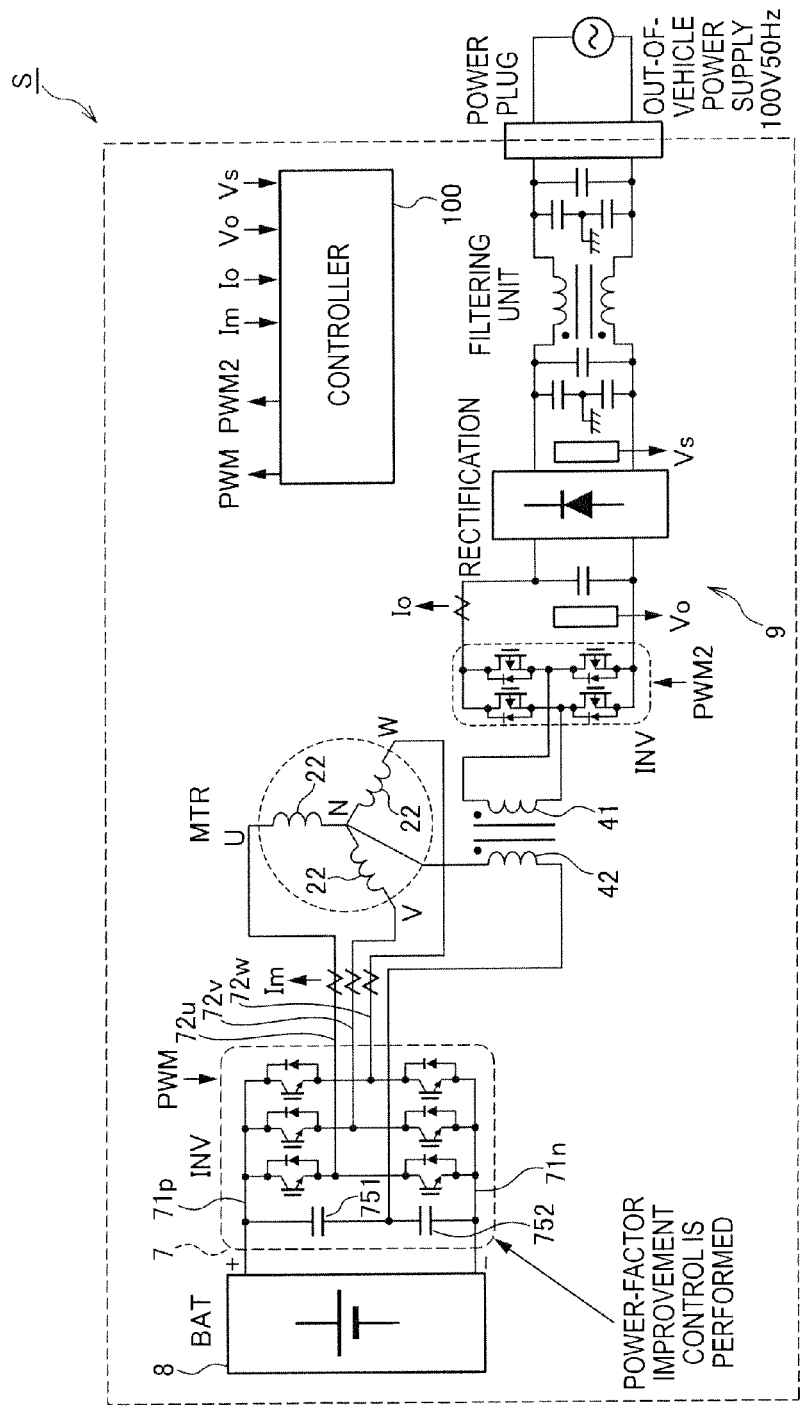
FIG. 12 is a diagram illustrating an in-vehicle rotary electric machine system according to a sixth embodiment of the present invention.

FIG. 12 is a diagram illustrating an in-vehicle rotary electric machine system according to a sixth embodiment of the present invention.

In the present embodiment, the embodiments described above are combined optimally.

The rotary electric machine illustrated in FIG. 6 is employed. As a result, no reactor is necessary. In addition, one end of the secondary coil 42 is connected to the neutral point (N-line), and the other end is connected between the capacitors 751 and 752. Furthermore, without providing a power-factor improvement circuit, the power-factor improvement control is performed using the DC/AC converter (inverter for driving the rotary electric machine) 7.

As a result, it is possible to remarkably reduce the number of components. Therefore, it is possible to lower a manufacturing cost and reduce a size as a whole.

(In-Vehicle Rotary Electric Machine System According to Seventh Embodiment)

Figure 13:
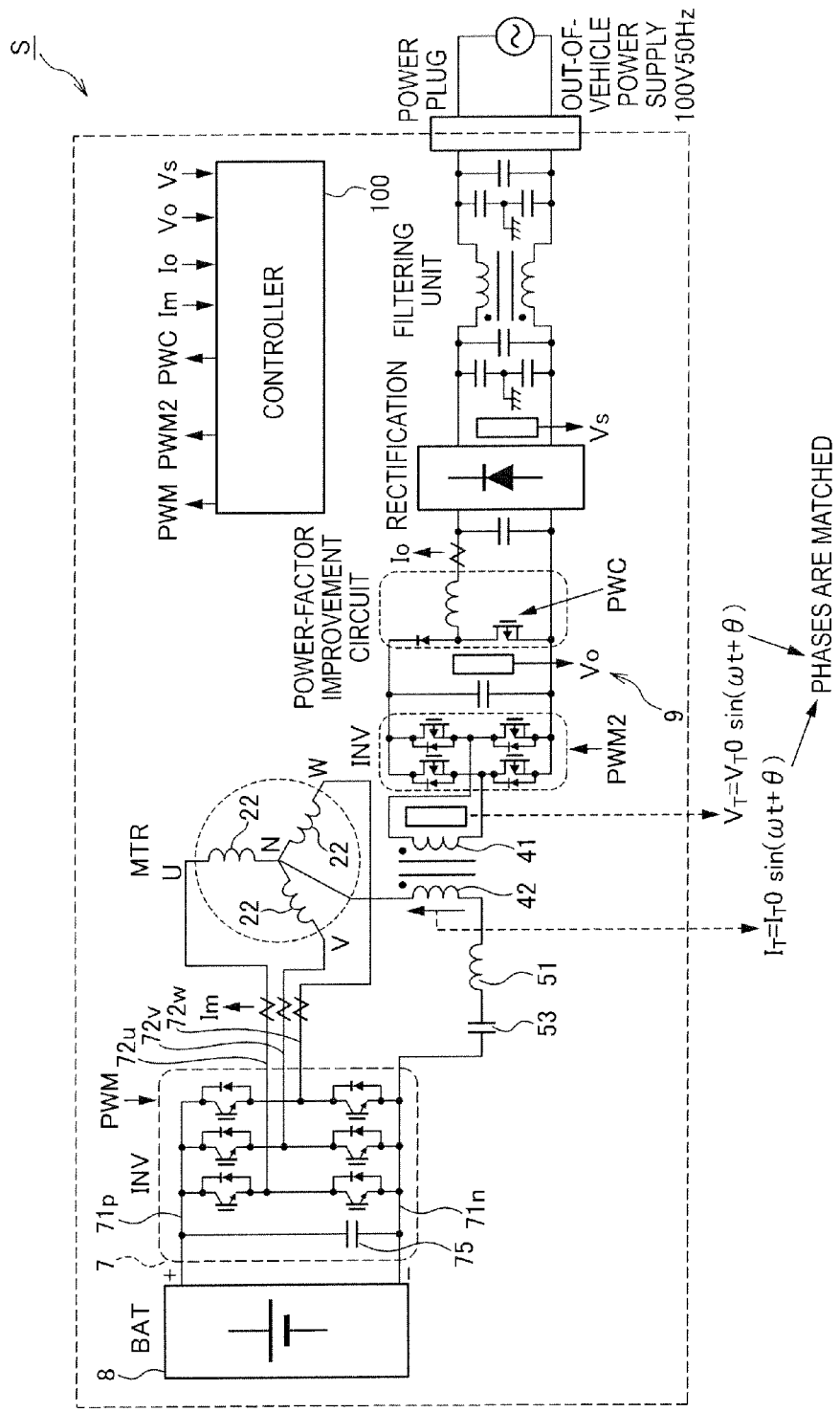
FIG. 13 is a diagram illustrating an in-vehicle rotary electric machine system according to a seventh embodiment of the present invention.

FIG. 13 is a diagram illustrating an in-vehicle rotary electric machine system according to a seventh embodiment of the present invention.

The charging electric power supplied from the out-of-vehicle power supply is obtained by multiplying the transformer current and the transformer voltage. According to the present embodiment, the transformer current and the transformer voltage are controlled. The transformer current can be controlled using the inverter 7 for driving the rotary electric machine. The transformer voltage can be controlled using the AC/AC converter of the power circuit 9.

According to the present embodiment, control is performed such that a phase of the transformer current controlled using the inverter 7 for driving the rotary electric machine matches a phase of the transformer voltage controlled by the AC/AC converter of the power circuit 9.

If control is performed in this manner, the power factor of the transformer operation increases. As the power factor increases, it is possible to miniaturize a transformer and a coupling capacitor and lower a manufacturing cost.

(In-Vehicle Rotary Electric Machine System According to Eighth Embodiment)

Figure 14:
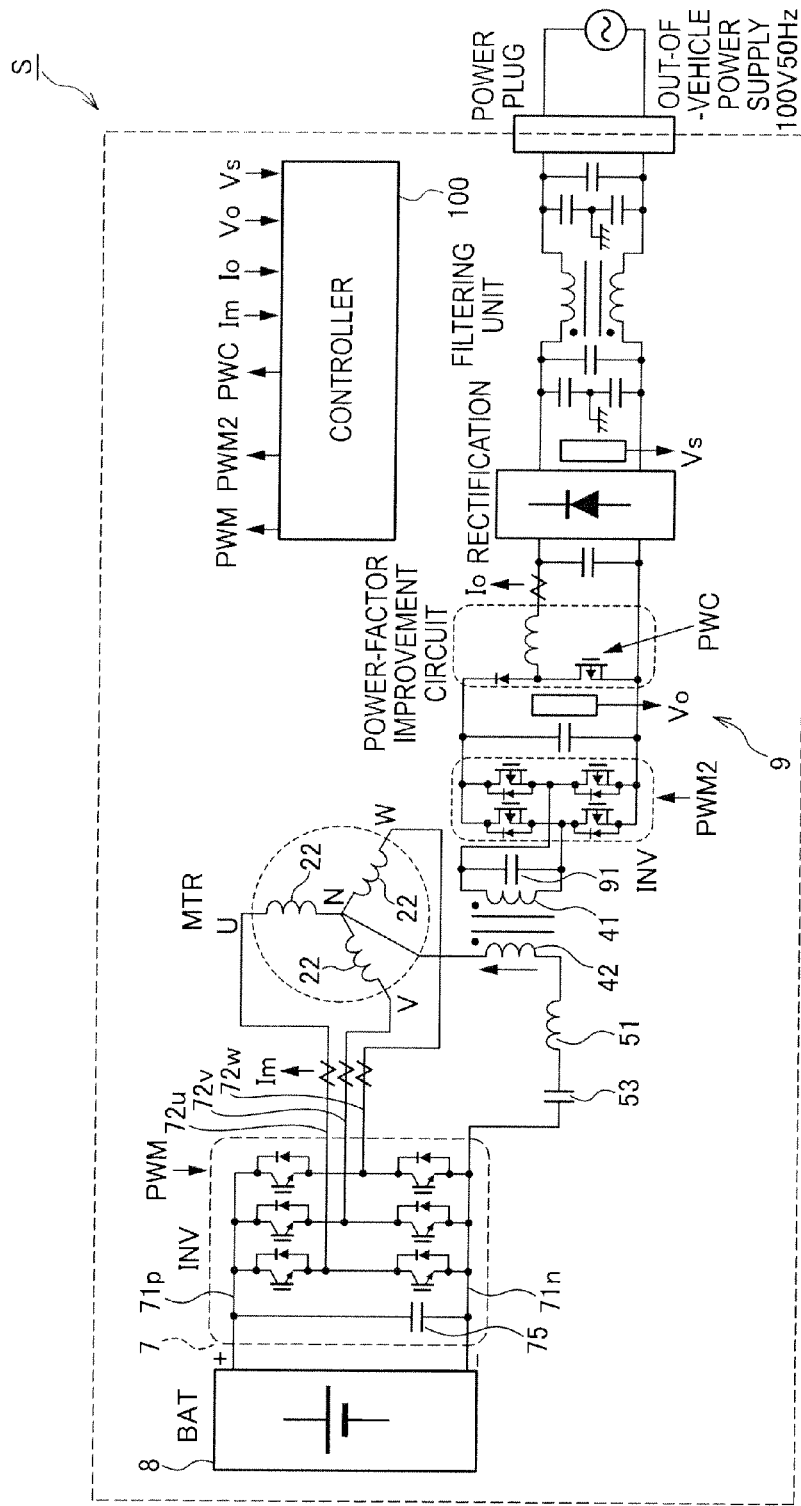
FIG. 14 is a diagram illustrating an in-vehicle rotary electric machine system according to an eighth embodiment of the present invention.

FIG. 14 is a diagram illustrating an in-vehicle rotary electric machine system according to the eighth embodiment of the present invention.

The power circuit 9 according to the present embodiment forms a resonant circuit by connecting the capacitor 91 to the primary coil 41 in parallel.

Similarly, in this configuration, the power factor of the transformer operation increases. As the power factor increases, it is possible to miniaturize the transformer and the coupling capacitor and lower a manufacturing cost. In addition, since it is possible to suppress a voltage of the inverter INV in the AC/AC converter of the power circuit 9, a small-sized inverter can be used.

(In-Vehicle Rotary Electric Machine System According to Ninth Embodiment)

Figure 15:
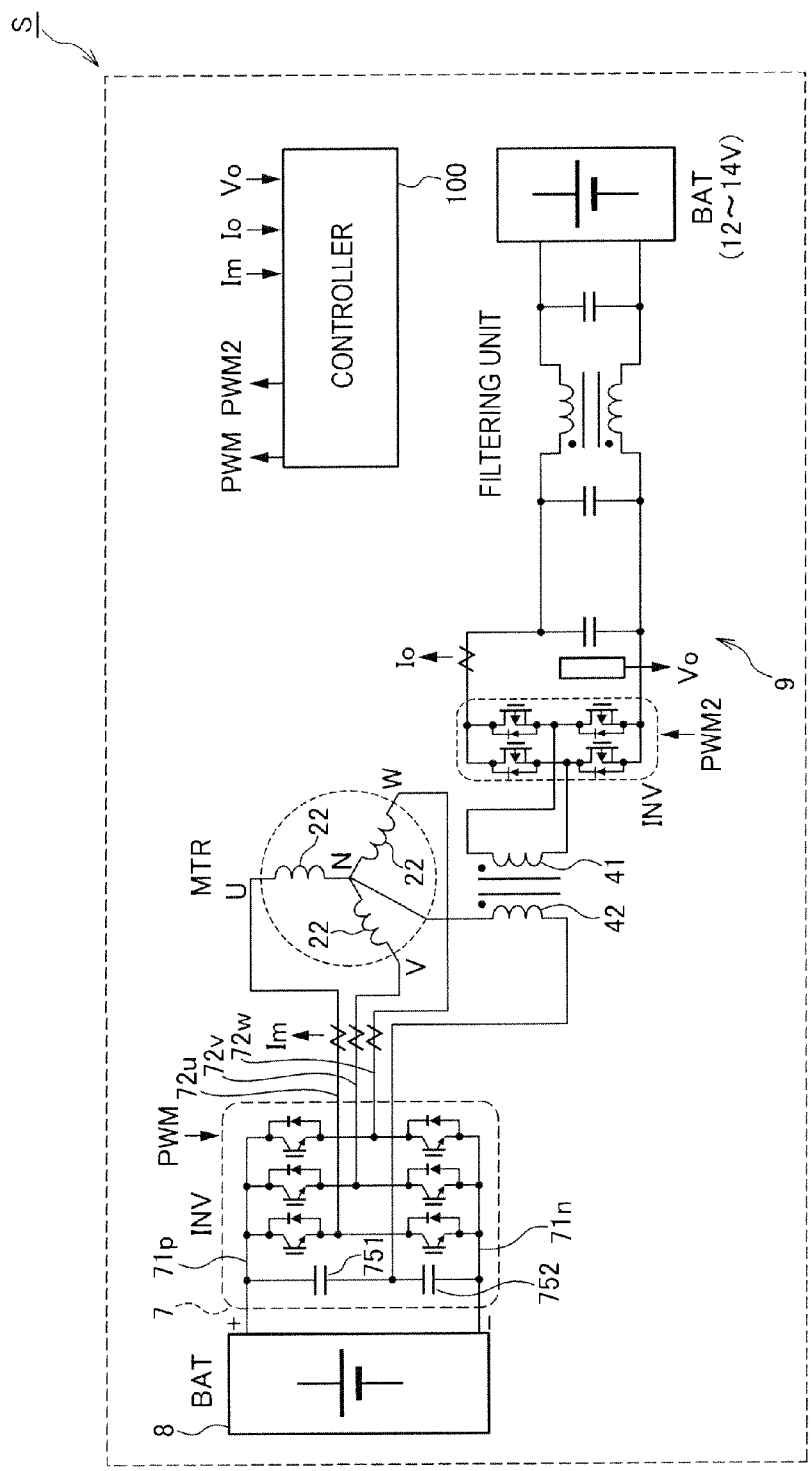
FIG. 15 is a diagram illustrating an in-vehicle rotary electric machine system according to a ninth embodiment of the present invention.

FIG. 15 is a diagram illustrating an in-vehicle rotary electric machine system according to a ninth embodiment of the present invention.

In each embodiment described above, description has been made for a case where the battery 8 is charged with the electric power from the out-of-vehicle power supply by using a circuit that flows electric power from the out-of-vehicle power supply as the power circuit 9.

The power circuit 9 according to the present embodiment is a circuit that flows an electric current to an accessory battery mounted on a vehicle to charge the accessory battery (voltage of 12 to 14 V) mounted on a vehicle.

As illustrated in FIG. 15, configurations of the rotary electric machine 1, the transformer, and the like are similar to those of each embodiment described above. Similarly, it is possible to reduce a size of the apparatus as a whole and lower the cost While the invention has been described with reference to certain specific embodiments, the embodiments described above only exemplify a part of the applications of the invention, and are not intended to limit the invention.

For example, although description has been exemplarily made for a case where the hole 21a is formed in the tab 212 obtained by protruding a part of the stator magnet core 21 in the aforementioned embodiments, the hole 21a may be formed in the stator magnet core 21 without forming the tab 212.

Although description has been exemplarily made for a case where the battery 8 is charged using the out-of-vehicle power supply in the in-vehicle rotary electric machine system according to the first to eighth embodiments, the invention may be similarly applied to a system that transmits the electric power generated from a vehicle to the out-of-vehicle power supply.

Although description has been exemplarily made for a radial gap motor in the embodiments described above, the invention may be similarly applied to an axial gap motor.

It should be noted that the embodiments described above may be appropriately combined.

The present application claims priority to Japanese Patent Application No. 2010-234765 filed in Japan Patent Office on Oct. 19, 2010. The contents of this application are incorporated herein by reference in their entirety.

The invention claimed is:

1. A rotary electric machine comprising:
   a rotor;
   a stator magnet core;
   a DC/AC converter formed by connecting a DC power line to a battery and connecting an AC power line to a stator coil wound around a tooth of the stator magnet core in an insulation state;
   a transformer primary coil wound around the stator magnet core in an insulation state and connected to a power circuit; and
   a transformer secondary coil that is wound around the stator magnet core in an insulation state and has one end connected to a neutral point of the rotary electric machine and the other end connected to the positive DC power line or the negative DC power line of the DC/AC converter.

2. The rotary electric machine according to claim 1, wherein:
   the stator magnet core is arranged outside the rotor and has a transformer formation hole penetrating in a rotor axis direction, and
   the transformer primary coil and the transformer secondary coil are wound around the stator magnet core through the transformer formation hole.

3. The rotary electric machine according to claim 1, wherein:
   the transformer primary coil and the transformer secondary coil are wound around a tooth of the stator magnet core to face each other in symmetry with respect to an axis of the stator magnet core.

4. The rotary electric machine according to claim 3, wherein:
   while the transformer primary coil and the transformer secondary coil are wound around teeth of the stator magnet core with a predetermined pitch and a predetermined population, the transformer primary coil and the transformer secondary coil are not wound around at least a pair of teeth.

5. The rotary electric machine according to claim 4, wherein:
   the predetermined pitch is set to an integer multiple of a value obtained by dividing the number of slots by the number of pole pairs.

6. The rotary electric machine according to claim 4, wherein:
   the predetermined population is set to an integer multiple of a value obtained by dividing the number of slots by the number of pole pairs.

7. The rotary electric machine according to claim 1, wherein:
the rotary electric machine is an in-wheel type rotary electric machine arranged in an inner circumference side of a load wheel, and
the rotary electric machine further comprises a reactor connected between the transformer secondary coil and the DC/AC converter and arranged in an outer circumference of a housing of the rotary electric machine.

8. The rotary electric machine according to claim 1, wherein:
the stator magnet core has a reactor formation hole penetrating in a rotor axis direction, and
the rotary electric machine further comprises a reactor that is connected between the transformer secondary coil and the DC/AC converter and includes a coil wound around the stator magnet core through the reactor formation hole.

9. An in-vehicle rotary electric machine system using the rotary electric machine according to claim 1, comprising:
a power circuit connected to the transformer primary coil;
a DC/AC converter connected to the transformer secondary coil and the stator coil;
a battery connected to the DC/AC converter; and
a current interrupter connected to the transformer secondary coil to cut off an electric current flowing through the transformer secondary coil when the rotary electric machine outputs a torque.

10. The in-vehicle rotary electric machine system according to claim 9, wherein:
the current interrupter is a switch arranged between the transformer secondary coil and the DC/AC converter and opened when the rotary electric machine outputs a torque.

11. The in-vehicle rotary electric machine system according to claim 9, wherein:
the current interrupter is a capacitor arranged between the transformer secondary coil and the DC/AC converter.

12. An in-vehicle rotary electric machine system using the rotary electric machine according to claim 7, comprising:
a power circuit connected to the transformer primary coil;
a DC/AC converter connected to the reactor and the stator coil;
a battery connected to the DC/AC converter; and
a current interrupter connected to the reactor to cut off an electric current flowing through the reactor when the rotary electric machine outputs a torque.

13. The in-vehicle rotary electric machine system according to claim 12, wherein:
the current interrupter is a switch arranged between the reactor and the DC/AC converter and opened when the rotary electric machine outputs a torque.

14. The in-vehicle rotary electric machine system according to claim 12, wherein:
the current interrupter is a capacitor arranged between the reactor and the DC/AC converter.

15. The in-vehicle rotary electric machine system according to claim 9, wherein:
the current interrupter also serves as a capacitor of the DC/AC converter.

16. The in-vehicle rotary electric machine system according to claim 9, wherein:
the power circuit includes a power-factor improvement circuit.

17. The in-vehicle rotary electric machine system according to claim 9, wherein:
the DC/AC converter performs power-factor improvement control based on an AC voltage and an AC electric current of the out-of-vehicle power supply side.

18. The in-vehicle rotary electric machine system according to claim 9, wherein:
the power circuit controls a voltage of the transformer primary coil,
the DC/AC converter controls an electric current of the transformer secondary coil, and
the power circuit and the DC/AC converter perform control such that a phase of the voltage of the transformer primary coil matches a phase of the electric current of the transformer secondary coil.

19. The in-vehicle rotary electric machine system according to claim 9, further comprising:
a capacitor connected to the transformer primary coil in parallel.

* * * * *